2,946,808
EPOXYALKYLTRIFLUOROMETHYLBENZENES

Samuel W. Tinsley, South Charleston, Paul S. Starcher, Charleston, and Joseph P. Henry, South Charleston, W. Va., assignors to Union Carbide Corporation, a corporation of New York No Drawing. Filed Sept. 30, 1958, Ser. No. 764,227

3 Claims. (Cl. 260—348)

The present invention relates to certain fluorine-containing epoxyalkylbenzenes which have been found particularly adaptable for use in the manufacture of polymers and as stabilizers for vinyl halide polymers such as a polyvinyl chloride.

The compounds of the invention can be conveniently represented by the following general formula:

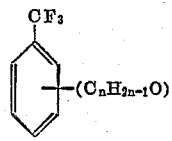

wherein the group ($C_nH_{2n-1}O$) represents an epoxy alkyl group composed of $n$ carbon atoms, $2n-1$ hydrogen atoms and one oxygen atom-attached to vicinal carbon atoms and where $n$ represents a whole positive integer in the range of 2 to 4.

The compounds of the invention are readily prepared by reacting a trifluoromethylalkenylbenzene and a peracid such as peracetic acid at temperatures of from about $-10°$ C. to about $85°$ C.

The amount of peracid employed to produce the epoxide is not a critical feature of the invention. Stoichiometic to excess peracid can be employed. It is preferred to employ an excess of peracid to insure complete epoxidation and drive the reaction to completion.

The peracids which have been found suitable for use in manufacturing the epoxides include peracetic acid, perbenzoic acid, monoperphthalic acid and the like. Peracetic acid is preferred because of its ready availability and low cost.

The trifluoromethylalkenylbenzenes which have been found operable in the process of the invention include ortho-trifluoromethylstyrene, meta-trifluoromethylstyrene, para-trifluoromethylstyrene, ortho-allylbenzotrifluoride, meta-allylbenzotrifluoride and para-allylbenzotrifluoride.

The following examples will serve to illustrate the practice of the invention:

EXAMPLE I

*Preparation of meta-(2,3-epoxypropyl)benzotrifluoride*

A solution (175 grams) of peracetic acid (29.6 percent) in ethyl acetate was added over a period of one hour to 105 grams of meta-allylbenzotrifluoride while maintaining the temperature at 40° C. The temperature was raised to 50° C. after the addition was completed and to 60° C. one hour later. After an additional reaction period of 4.5 hours at 60° C. an analysis for peracetic acid indicated that 93 percent of the theoretical amount of peracid had been consumed. The reaction mixture was co-distilled with ethylbenzene to help with the rapid removal of acetic acid. Fractionation of the acid-free reaction product on a Vigreaux column gave 92 grams (80 percent yield) of meta-(2,3-epoxypropyl)benzotrifluoride, a colorless liquid having the following properties: Boiling point=82° C./5 mm., $n$ 30/D =1.4560.

*Analysis.*—Calculated for $C_{10}H_9F_3O$: C, 59.4; H, 4.48. Found: C, 59.13; H, 4.49. Purity (from pyridine-HCl epoxide analysis)=98.8 percent.

EXAMPLE II

*Preparation of meta-trifluoromethylstyrene oxide*

A solution of peracetic acid (171 grams of 29.4 percent conc.) in ethyl acetate was heated to 40° C. and to it with stirring was added 76 grams of meta-trifluoromethylstyrene (contg. 0.07 gram trinitrobenzene stabilizer) over a period of about 35 minutes. After an additional reaction period of 4 hours at 40–50° C. an analysis for peracetic acid indicated a conversion of 96 percent. The excess acid was removed by co-distillation with ethylbenzene under reduced pressure. The residue product was flashed on a one-plate column and the distillate was fractionated on a small column to give 59 grams (71 percent yield) of meta-trifluoromethylstyrene oxide, a colorless liquid having the following properties: Boiling point=58° C./3 mm., $n$ 30/D=1.4590.

*Analysis.*—Calculated for $C_9H_7F_3O$: C, 57.45; H, 3.75. Found: C, 58.0; H, 3.76. Purity (by epoxide analysis) =96 percent.

What is claimed is:

1. As new epoxides, epoxyalkylbenzenes characterized by the formula

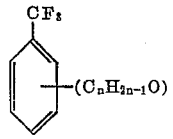

wherein the group ($C_nH_{2n-1}O$) represents an epoxyalkyl group composed of $n$ carbon atoms, $2n-1$ hydrogen atoms and one oxygen atom-attached to vicinal carbon atoms and where $n$ represents a whole positive integer in the range of 2 to 4.

2. As a new epoxide, meta(2,3-epoxypropyl)benzotrifluoride.

3. As a new epoxide, meta(epoxyethyl)benzotrifluoride.

No references cited.